Figure 1:
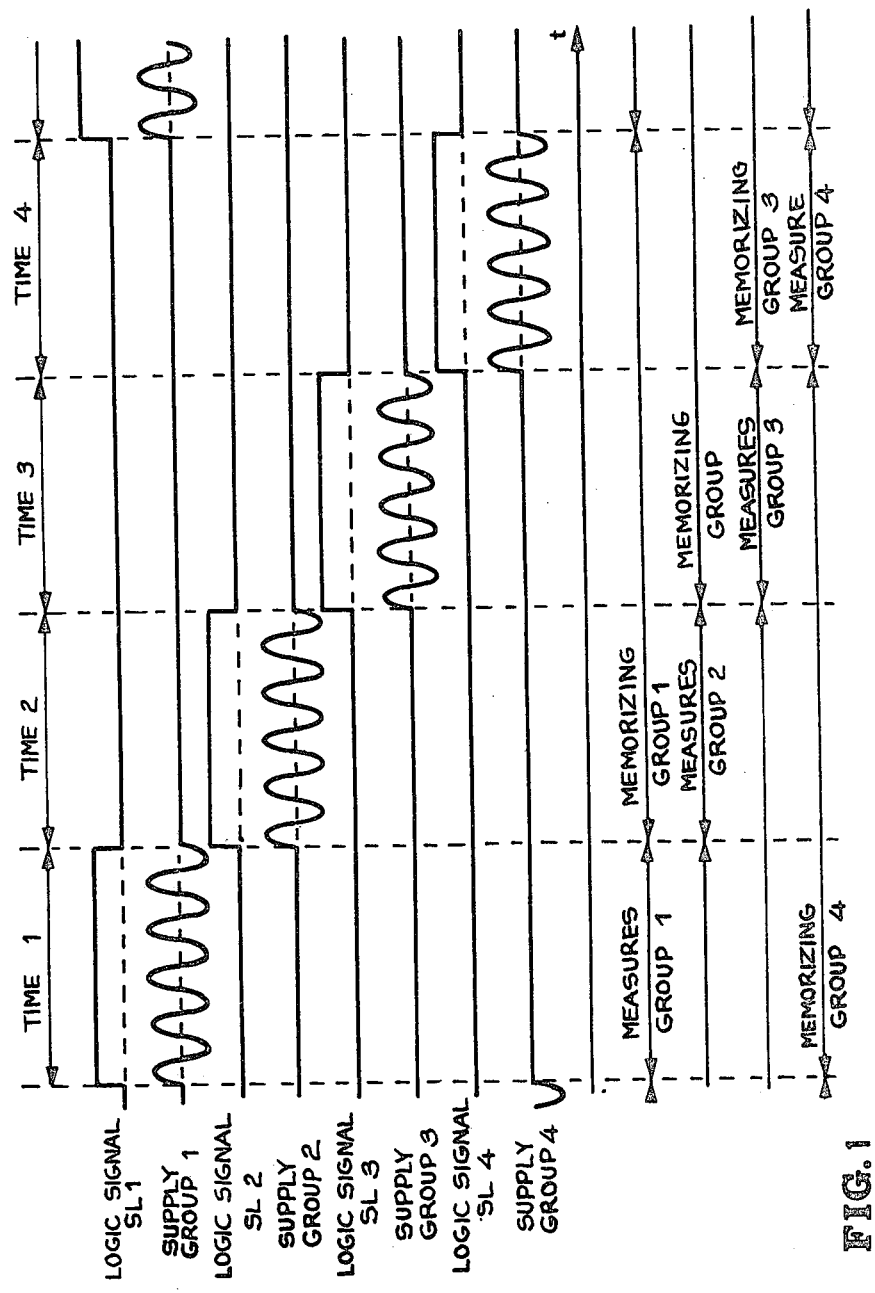

United States Patent [19]

Dardenne

[11] 4,201,940
[45] May 6, 1980

[54] METHOD AND APPARATUS FOR MEASURING THE POSITION OF REGULATING RODS IN A NUCLEAR REACTOR

[75] Inventor: Regis Dardenne, Roselies, Belgium

[73] Assignee: ACEC, Ateliers de Constructions Electriques de Charleroi, Charleroi, Belgium

[21] Appl. No.: 917,274

[22] Filed: Jun. 20, 1978

Related U.S. Application Data

[63] Continuation of Ser. No. 710,107, Jul. 30, 1976, abandoned.

[30] Foreign Application Priority Data

Jul. 31, 1975 [BE] Belgium ............... 158796

[51] Int. Cl.² ........................................... G01R 33/00
[52] U.S. Cl. .............................. 324/207; 176/19 R; 176/36 R
[58] Field of Search ............... 324/207, 208, 219; 176/19 R, 36 R; 340/195, 196, 282

[56] References Cited

U.S. PATENT DOCUMENTS

| 3,742,409 | 6/1973 | Santis | 176/19 R |
| 3,854,086 | 12/1974 | Watanabe | 324/207 |
| 3,875,089 | 12/1974 | Adler et al. | 324/207 |

FOREIGN PATENT DOCUMENTS

845207  8/1960  United Kingdom ............... 176/36 R

Primary Examiner—M. Tokar
Attorney, Agent, or Firm—Schwartz, Jeffery, Schwaab, Mack, Blumenthal & Koch

[57] ABSTRACT

A method and an apparatus for measuring the position of regulating rods in a nuclear reactor through the measure of a voltage appearing across the terminals of an induction coil fed by a constant current AC supply, each regulating rod being interlocked with a control rod able to move along the longitudinal axis of said coil. The regulating rods are grouped into a plurality of groups in such a way that the said regulating rods are randomly distributed throughout the reactor so that no two regulating rods in the same group are located close to one another. The thus formed groups of regulating rods are energized in sequence, and the voltage appearing across the terminals of the coils of each group is measured during a time interval corresponding to the feeding time interval of that group. The voltage is then memorized for a time interval corresponding to the non-feeding time period of the group.

2 Claims, 4 Drawing Figures

FIG. 4

FIG. 3

LEGEND

☐ ROD POSITION MEASURED DURING PHASE 1
☐ ROD POSITION MEASURED DURING PHASE 2
☐ ROD POSITION MEASURED DURING PHASE 3
☐ ROD POSITION MEASURED DURING PHASE 4

METHOD AND APPARATUS FOR MEASURING THE POSITION OF REGULATING RODS IN A NUCLEAR REACTOR

This is a continuation of application Ser. No. 710,107, filed July 30, 1976, now abandoned.

The present invention relates to a method and an apparatus for measuring the position of regulating rods in nuclear reactors.

In nuclear reactors, it is known to use a regulating rod interlocked with a channeled control rod, of a magnetic material, which is actuated by means of electromagnetically controlled catches. The free extremity of the control rod moves along the longitudinal axis of an induction coil which is fed in constant current by an AC supply through a high impedance element.

As the induction coil impedance varies in relationship with the penetration depth of the control rod in the coil, the measure of the voltage set at the terminals of the coil therefore gives an indication of the position of the regulating rod.

In those known systems, the feeding of the regulating rod induction coils is effected on a permanent basis. Thus, magnetic couplings occur between the numerous nearby or adjacent regulating rod coils, and, as a result, the measurements obtained through the known processes do not offer realistic data on the actual position of the regulating rods and are consequently erroneous.

The object of the present invention resides in a process for indicating and measuring the position of regulating rods in a nuclear reactor, which process substantially eliminates the prior art drawbacks.

According to the present invention, the process for measuring the position of regulating rods in a nuclear reactor through the measure of the voltage at the terminals of an induction coil fed by a constant current AC supply, a control rod of a magnetic material being moved along the longitudinal axis of the coil, the control rod being interlocked with the regulating rod, is characterized by the steps of arranging the regulating rod into a certain number of groups in such a way that the said regulating rods are randomly distributed throughout the reactor so that no two regulating rods in the same group are located close to one another, feeding the thus formed groups of regulating rods in sequence, measuring the voltage across the terminals of the induction coils only during a time interval corresponding to the feeding time of a group of coils, and memorizing the measured voltage for a time period during which that group is not fed by said AC supply.

The present invention is also concerned with an apparatus to carry on the above method.

Figure 2:
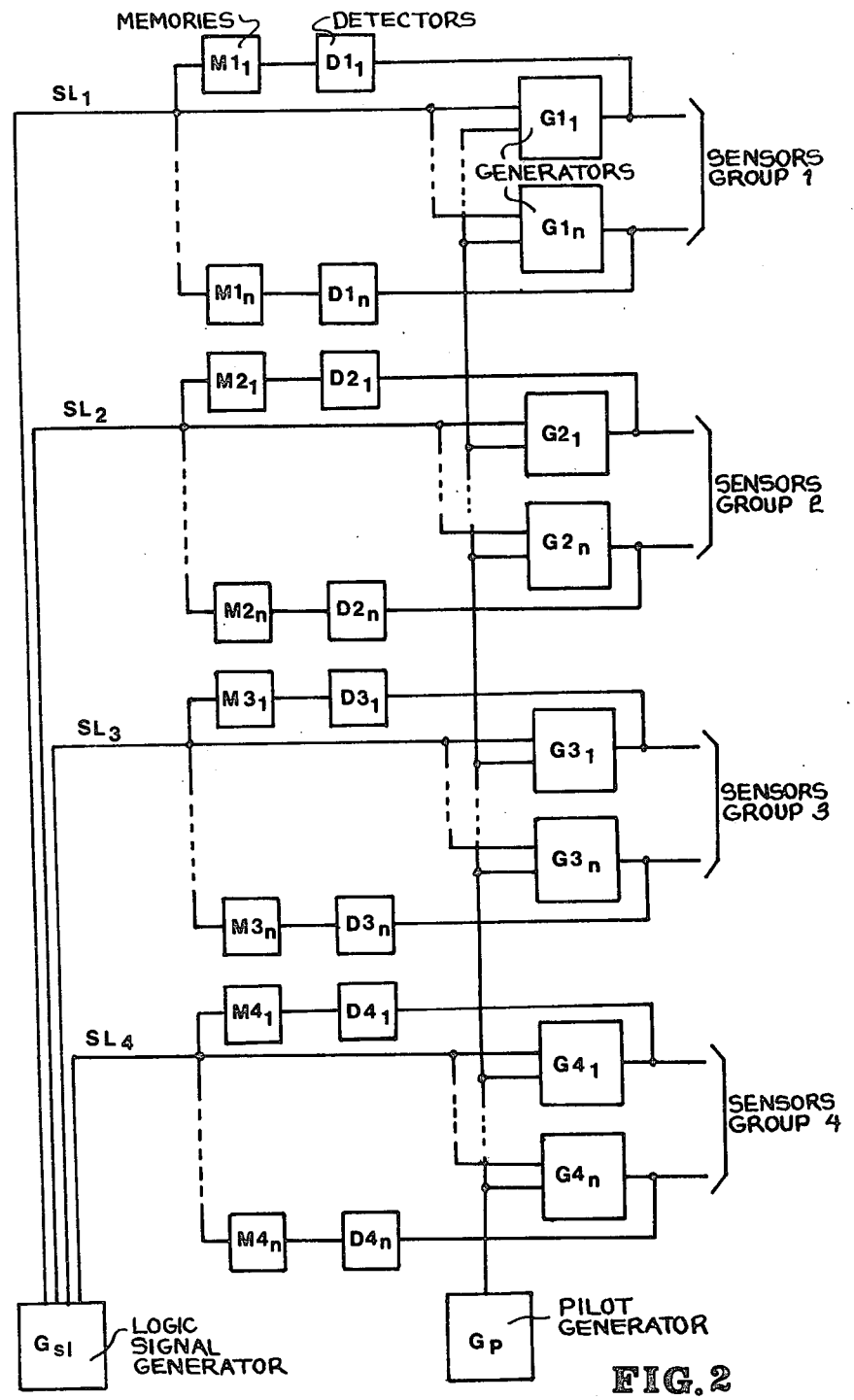

A preferred embodiment of the present invention will be hereinafter described with reference to the accompanying drawings, wherein:

FIG. 1 is a diagram showing the operation method of the present invention;

FIG. 2 schematically shows an apparatus suitable to carry on the method of FIG. 1

FIG. 3 is a diagram of the reactor cover showing rod layout and the rod position measured during each of the four phases; and FIG. 4 is a diagram showing the reactor cover layout but shows only the rod positions measured during each of the four phases of measurement.

Assuming first that the regulating rods of the nuclear reactor are distributed into four groups and so arranged that no two regulating rods in the same group are located close to one another, the manner in which the grouping is effected not being itself part of the instant method for measuring the position of the regulating rods.

Referring to FIG. 1, the sensors of each group, when initiated by the logic signals $SL_1$, $SL_2$, $SL_3$, and $SL_4$, are fed by a constant current AC supply through a high impedance (not shown), so that group 1 is fed during a time interval corresponding to time 1, group 2 to time 2, group 3 to time 3, and group 4 to time 4.

Then, by any suitable method, the voltage appearing across the terminals of the induction coil of the sensors of a group is measured, the measuring time interval corresponding to the feeding time of that group, which time is related to the duration of the logic signal, as mentioned above.

These groupings can easily be seen be reference to FIG. 3 which is a reactor cover showing the rod group layout. The rods are labeled CA, CB, CC, CV, SA and SB. Each of these labels corresponds to a rod group or nuclear functional group; rods with the same letters being in the same functional groups move together to control neutron flux and reactor power. In addition, FIG. 3 also indicates which rods are measured to determine their position during each of the four phases. This is shown by the positioning of a dot in one of the corners of the square indicating the existence of a regulating rod in that location in the reactor cover. The legend at the bottom of FIG. 4 explains this code. The measuring of rod position in such a manner, being broken down into four phases, effectively organizes the rods into instrumentation groups.

These instrumentation groups are shown more clearly in FIG. 4, in which numbers which correspond to those rods measured during each phase are utilized, instead of dots in the corners of each square as in FIG. 3. By reference to FIG. 4 one can easily see that utilizing the within disclosed method and apparatus for measuring the position of nuclear regulating rods, said regulating rods are randomly distributed througout the reactor so that no two regulating rods in the same group are located close to one another.

Therefore, it can be seen that the sensors of two adjacent regulating rods are at no time conjointly fed, and consequently the measures of the voltages appearing across the terminals of the induction coils of a given group of sensors are free from any magnetic couplings between the sensors. The prior art drawback mentioned above is thus avoided. It is to be noted that the higher the number of regulating rod groups, the better is the result offered by this method. Also, an increase in the number of groups will allow a proportional increase in the number of feed and measure points.

FIG. 2 of the drawings schematically illustrates an apparatus carrying on the above-described method. In FIG. 2, each sensor of a group of regulating rods is fed by a constant current AC generator. Thus, the sensors of group 1 are respectively fed by generators $G1_1 \ldots G1_n$, the sensors of group 2 by generators $G2_1 \ldots G2_n$, the sensors of group 3 by generators $G3_1 \ldots G3_n$ and the sensors of group 4 by the generators $G4_1 \ldots G4_n$ All those generators are under the control of an AC pilot generator GP.

A logic signal generator $G_{sl}$, generating the logic signals $SL_1$, $SL_2$, $SL_3$ and $SL_4$, controls the sequential feeding of the sensors so that the generators $G1_1 \ldots G1_n$ become operative only when the logic signal $SL_1$ is generated, so that the generator $G2_1 \ldots G2_n$ become operative only when the logic signal $SL_2$ is produced, so that the generators $G3_1 \ldots G3_n$ become operative only when the logic signal $SL_3$ is initiated and so that the generators $G4_1 \ldots G4_n$ become operative only when the logic signal $SL_4$ is issued.

A detector for detecting the voltage appearing across the terminals of the induction coil is provided for each sensor. Thus, the detectors $D1_1 \ldots D1_n$ measure the voltage for the sensor of group 1 whereas the detectors $D2_1 \ldots D2_n$, $D3_1 \ldots D3_n$ and $D4_1 \ldots D4_n$ measure the voltage in the sensors of groups 2, 3 and 4, respectively.

As indicated above, the measures obtained from the voltage detectors are to be memorized. Therefore, memories $M1_1 \ldots M1_n$ which are controlled by the logic signal $SL_1$ are associated to the detectors $D1_1 \ldots D1_n$ of the first group of regulating bars, so as to record the measures made by detectors $D1_1 \ldots D1_n$ during time 1 and to keep those measures into memory for the times 2, 3 and 4 (see FIG. 1). Similarly, memories $M2_1 \ldots M2_n$, $M3_1 \ldots M3_n$ and $M4_1 \ldots M4_n$ are associated to the detectors $D2_1 \ldots D2_n$, $D3_1 \ldots D3_n$ and $D4_1 \ldots D4_n$, respectively. Thus, the measures obtained at time 2 are kept into the respective memories during times 3, 4 and 1, whereas those picked up at time 3 remain in the memories during times 4, 1 and 2, and finally the measures obtained during time 4 are memorized for a period corresponding to times 1, 2 and 3.

At the end of the memorizing cycle, the memories of a given group are reset to zero upon the next occurrence of the logic signal controlling that group, thereby allowing the picking up of new measures from that particular group.

I claim:

1. A method for measuring the position of regulating rods in a nuclear reactor through the measure of a voltage appearing across the terminals of an induction coil fed by a constant current AC supply, each regulating rod being interlocked with a control rod able to move along the longitudinal axis of said coil, said process comprising the steps of arranging said regulating rods into a certain number of groups in such a way that the said regulating rods are randomly distributed throughout the reactor so that no two regulating rods in the same group are located close to one another, feeding the thus formed groups of regulating rods in sequence, measuring the voltage appearing across the terminals of the coils of each group during a time interval corresponding to the feeding time interval of that group, and memorizing said voltage for a time interval corresponding to the non-feeding time period of the group.

2. An apparatus for measuring the position of regulating rods in a nuclear reactor, wherein each regulating rod is an intergral part of a control rod of a magnetic material capable of movement along the longitudinal axis of an induction coil fed by a constant current AC generator, and wherein a detector is connected to each induction coil to measure the voltage appearing across the terminals of that coil, said apparatus comprising a certain number of groups of said regulating rods so arranged that the said regulating rods are randomly distributed throughout the reactor so that no two regulating rods in the same group are located closed to one another, the AC generators of a given group of regulating rods being simultaneously operative, means for sequentially controlling the separate and successive feeding of said generators, and for controlling the recording of said voltage detected by said detectors by means of memories and the memorizing of the recorded voltage in a given group for a time period corresponding to the non-operative time of the generators of that group.

* * * * *